United States Patent [19]
Zguris

[11] Patent Number: 6,071,641
[45] Date of Patent: Jun. 6, 2000

[54] GLASS FIBER SEPARATORS AND BATTERIES INCLUDING SUCH SEPARATORS

[76] Inventor: George C. Zguris, 6 New Rd., Canterbury, N.H. 03224

[21] Appl. No.: 08/923,876

[22] Filed: Sep. 2, 1997

[51] Int. Cl.[7] .................................................. H01M 2/16
[52] U.S. Cl. ........................... 429/144; 429/247; 429/252
[58] Field of Search ........................... 429/144, 247–251, 429/252

[56] References Cited

U.S. PATENT DOCUMENTS

| | | |
|---|---|---|
| 2,117,371 | 5/1938 | Slayter . |
| 2,311,613 | 2/1943 | Slayter . |
| 2,339,431 | 1/1944 | Slayter . |
| 2,477,000 | 7/1949 | Osborne . |
| 2,484,787 | 10/1949 | Grant ....................................... 429/252 |
| 2,734,095 | 2/1956 | Mears et al. ........................ 429/252 X |
| 3,085,126 | 4/1963 | Labino . |
| 3,338,777 | 8/1967 | Irwin . |
| 3,608,166 | 9/1971 | Gruget . |
| 4,205,122 | 5/1980 | Miura et al. . |
| 4,216,280 | 8/1980 | Kono et al. . |
| 4,216,281 | 8/1980 | O'Rell et al. . |
| 4,245,013 | 1/1981 | Clegg et al. . |
| 4,359,511 | 11/1982 | Strzempko . |
| 4,363,856 | 12/1982 | Waterhouse . |
| 4,367,271 | 1/1983 | Hasegawa et al. . |
| 4,373,015 | 2/1983 | Peters et al. . |
| 4,387,144 | 6/1983 | McCallum et al. . |
| 4,465,748 | 8/1984 | Harris . |
| 4,522,876 | 6/1985 | Hiers . |
| 4,529,677 | 7/1985 | Bodendorf . |
| 4,648,177 | 3/1987 | Uba et al. ............................ 429/247 X |
| 4,908,282 | 3/1990 | Badger . |
| 5,075,184 | 12/1991 | Tanaka et al. ........................... 429/144 |
| 5,076,826 | 12/1991 | Teeter . |
| 5,091,275 | 2/1992 | Brecht et al. . |
| 5,180,647 | 1/1993 | Rowland et al. .................... 429/144 X |

FOREIGN PATENT DOCUMENTS

| | | |
|---|---|---|
| 7-147154 A1 | 6/1995 | Japan . |
| 9-92252A | 4/1997 | Japan . |
| WO 98/12759 | 3/1998 | WIPO . |

OTHER PUBLICATIONS

Ceramics and Glass—vol. 4 of the "Enginneered Materials Handbook" published by ASM International, month not applicable, 1991.

*Primary Examiner*—Stephen Kalafut
*Attorney, Agent, or Firm*—John C. Purdue; David C. Purdue

[57] ABSTRACT

A lead acid battery having a glass fiber separator material is disclosed. The separator material is a mass of intermeshed glass fibers produced by suspending glass fibers in a gaseous medium, and collecting the suspended glass fibers on a foraminous material. The mass of fibers suspended in the gaseous medium has a BET surface area of from 0.2 to 5 $m^2$ per gram. A battery having a glass fiber separator material with added cellulose fibrils is also disclosed, as is a battery having a glass fiber separator material with added particulate material such as silica.

18 Claims, 9 Drawing Sheets

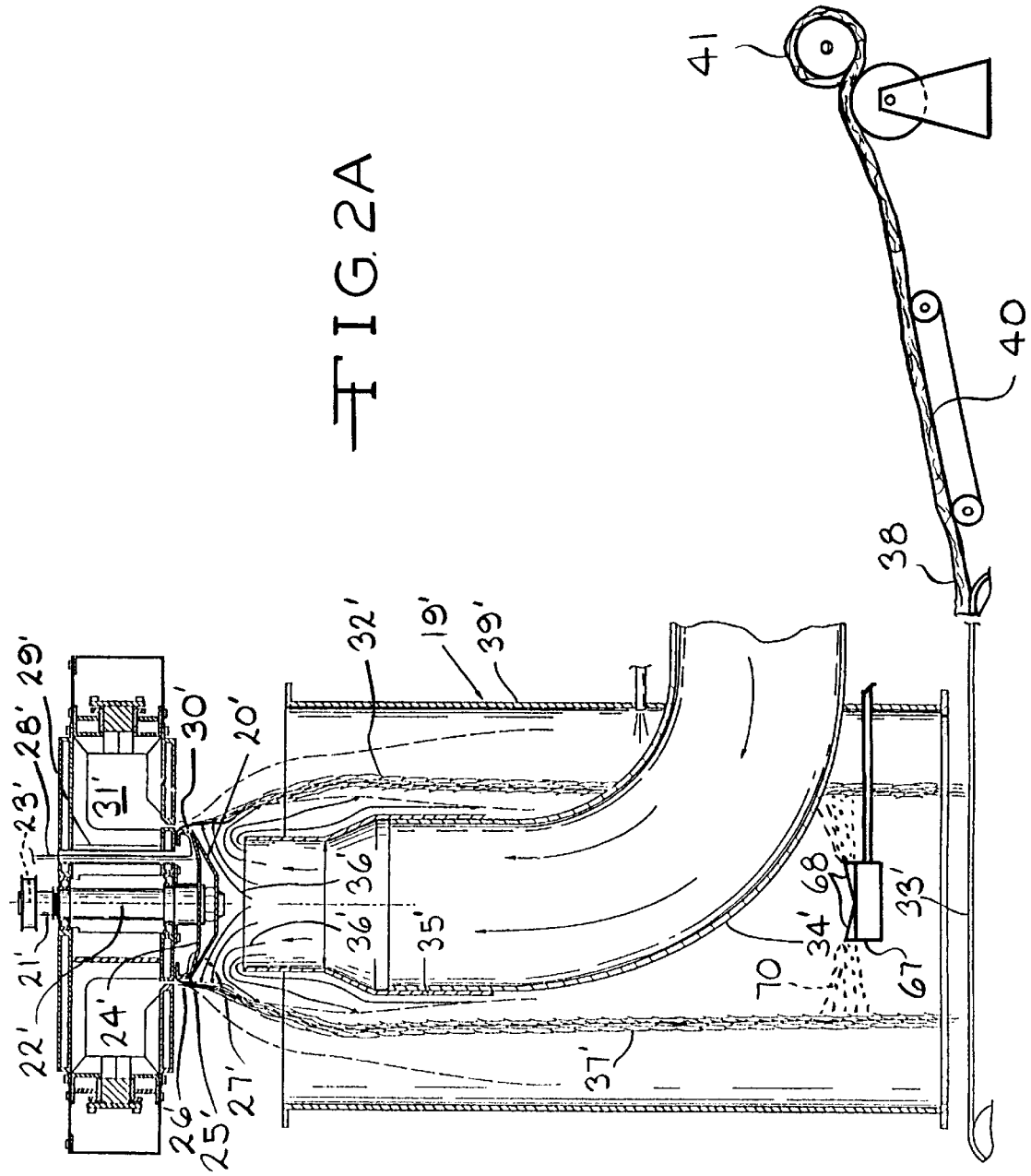

6,071,641

GLASS FIBER SEPARATORS AND BATTERIES INCLUDING SUCH SEPARATORS

BACKGROUND OF THE INVENTION

1. Field of the Invention

The present invention relates generally to the field of batteries and, more specifically, to batteries in which separators containing glass fibers are positioned between the positive and negative plates and to a method for producing such separators and batteries. As is subsequently discussed in more detail, separators containing glass fibers are well known. Long before glass fiber separators, however, cedar veneers were used as a separator material, and were replaced by microporous, hard rubbery separators and cellulose separators impregnated with resins.

2. Description of the Prior Art

Valve regulated ("sealed"—"recombinant") lead acid (VRLA) batteries are known; they usually comprise a plurality of positive and negative plates, as in a prismatic cell, or layers of separator and positive and negative electrodes wound together, as in a "jelly roll" cell. The plates are arranged so that they alternate, negative—positive—negative, etc., with separator material separating each plate from adjacent plates. The separator, typically composed of a mat of glass fibers, is an inert material; it stores battery acid, and provides low electric resistance. In addition, in VRLA batteries, the separator material provides innumerable gas channels between the plates through which oxygen can migrate from the positive electrode, when generated there, to the negative electrode where it can be recombined with hydrogen, according to the oxygen cycle. Another important function of a separator is to exert pressure against the plate paste or active material which forces the paste into contact with the plate, and causes a pressure between the plates, ensuring that there is an interface, along the faces of the plates, among the plate paste or active material, the electrolyte and oxygen.

Glass fibers have been produced commercially by numerous methods, commonly known as steam blown, rotary, flame blown and textile processes. These processes are discussed in Volume 4 of the *Engineered Materials Handbook*, published by ASM International, 1991. The disclosure of this publication is incorporated herein by reference.

Glass fiber separator material has been produced commercially by wet processes on paper making equipment including fourdrinier machines and rotoformers, inclined fourdrinier machines and extended wire rotoformers. In the production of separator made of glass fibers for VRLA batteries, it is preferred that no organic binder be added to a furnish from which separator sheets are made; the entanglement of individual fibers serves to maintain the sheet in a cohesive structure, and water glass, which sometimes forms on the fiber surfaces, serves as a binder. Organic binders, however, tend to decrease the ability of a separator to wick acid, and to decrease the amount of acid a separator can hold. A great deal of work has been directed to modifying the glass fiber furnish from which separators are produced to improve battery performance and/or lower the cost of the separator. Some of the work has entailed the addition of synthetic fibers for various reasons, such as the use of thermoformable plastic fibers so that the separator can be heat sealed on its edges to envelop a plate. Other work, which pertains to the field of this invention, has been directed to the use of filler, e.g., silica, to provide separators which are comparable to all glass fiber separators, at a lower cost. Separators made from glass fibers to which cellulose has been added and polyolefin fibers to which cellulose has been added have also been suggested. Prior art patents are discussed below.

U.S. Pat. No. 4,465,748 (Harris) discloses glass fiber sheet material for use as a separator in an electrochemical cell, and made from 5 to 35 percent w/w of glass fibers less than 1 $\mu$m in diameter; the patent also discloses a glass fiber sheet for such use wherein there are fibers of a continuous range of fiber diameters and lengths, and most of the fibers are not over 5 mm in length.

U.S. Pat. No. 4,216,280, (Kono et al.), discloses glass fiber sheet material for use as a plate separator in a battery, and made from 50 to 95 percent w/w of glass fibers less than 1 $\mu$m in diameter and 50 to 5 percent w/w of coarser glass fibers. The coarser glass fibers, the reference says, have a fiber diameter larger than 5 $\mu$m, preferably larger than 10 $\mu$m, and it is advantageous for some of the coarser fibers to have diameters of 10 $\mu$m to 30 $\mu$m.

U.S. Pat. No. 4,205,122 (Minra et al) discloses a battery separator of reduced electric resistance comprising a self supporting, non woven mat consisting essentially of a mixture of olefinic resin fibers having a coarseness of from 4 to 13 decigrex and olefinic resin fibers having a coarseness of less than 4 decigrex, the latter fibers being present in an amount of not less than 3 parts by weight per 100 parts by weight of fibers; up to about 600 parts by weight of inert filler materials per 100 parts by weight of fibers can also be used. The battery separator is produced by subjecting a suitable aqueous dispersion to a sheet-forming operation, drying the resulting wet, non-woven mat, and heat treating the dried mat at a temperature ranging from a point 20° lower than the melting point of the aforementioned fibers to a point about 50° higher than the melting point.

U.S. Pat. No. 4,216,281 (O'Rell et al.) discloses a separator material produced from a furnish containing 30 to 70 percent w/w of polyolefin synthetic pulp, 15 to 65 percent w/w of a siliceous filler and 1 to 35 percent w/w of "long" fibers which can be polyester fibers, glass fibers, or a mixture of the two. Cellulose in an amount up to about 10 percent w/w is disclosed as an optional ingredient of the furnish.

U.S. Pat. No. 4,363,856 (Waterhouse) discloses a separator material made from a furnish composed of polyolefin pulp fibers and glass fibers, and names polyester staple fibers, polyolefin staple fibers and cellulose pulp fibers as alternative constituents of the furnish.

U.S. Pat. No. 4,387,144 (McCallum) discloses a battery separator having a low electrical resistance after extended use which is made by thermal consolidation and thermal embossing of a paper web formed from a furnish containing a synthetic pulp the fibrils of which are filled with an inorganic filler, the web incorporating a wetting agent which is preferably an organic sulphonate, and organic succinate, or phenol ethoxylate.

U.S. Pat. No. 4,373,015 (Peters et al.), discloses sheet material for use as a separator in a battery, and "comprising organic polymeric fibers"; both of the examples of the reference describe the sheet material as "short staple fiber polyester matting about 0.3 mm thick", and indicate that the polyester fibers range from about 1 $\mu$m to about 6 $\mu$m in diameter.

Sheet separators for use in conventional (not valve regulated) batteries and comprising both glass fibers and organic fibers are disclosed in all of the following U.S. Patents: No. 4,529,677 (Bodendorf); No. 4,363,856 (Waterhouse); and No. 4,359,511 (Strzempko).

U.S. Pat. No. 4,367,271, Hasegawa, discloses storage battery separators composed of acrylic fibrils in an amount of up to about 10 percent w/w, balance glass fibers.

Japanese patent document 55/146,872 discloses a separator material comprising glass fibers (50–85 percent w/w) and organic fibers (50–15 percent w/w).

U.S. Pat. No. 4,245,013, Clegg et al., discloses a separator made by overlaying a first sheet of fibrous material including polyethylene fibers with a second sheet of fibrous material including polyethylene and having a synthetic pulp content higher than the first sheet.

U.S. Pat. No. 4,908,282, Badger, discloses a separator comprising a sheet made from first fibers which impart to the sheet an absorbency greater than 90% and second fibers which impart to the sheet an absorbency less than 80% wherein the first and second fibers are present in such proportions that the sheet has an absorbency of from 75 to 95%. This patent discloses that fine glass fibers have a high absorbency, that coarse glass fibers have a low absorbency, and that hydrophobic organic fibers have an extremely low absorbency, and that, when this separator is saturated with electrolyte, unfilled voids remain so that gas can transfer from plate to plate for recombination. The disclosure of Badger is incorporated herein by reference.

U.S. Pat. No. 5,091,275 (Brecht et al.) discloses a glass fiber separator which expands when exposed to electrolyte. The separator comprises glass fibers which are impregnated with an aqueous solution of colloidal silica particles and a sulfate salt. The separator is produced by forming a paper making web of glass fibers, impregnating the web with the aqueous mixture of silica and the salt, lightly compressing the impregnated web to remove some of the aqueous solution, partially drying the web, compressing the web to a final thickness and completing the drying of the web. The web is preferably compressed to a thickness which is less than the distance between plates in a given cell, so that insertion of an assembled cell stack into a case is facilitated. When electrolyte is added to the case, the salt dissolves in the electrolyte and the separator expands to provide good contact between the plates and the separators. According to the patent, the silica contributes to the recombination performance of cells incorporating the pre-compressed separator. The silica also contributes a great deal of stiffness to the separator, so much so that the separator may be characterized as rigid.

It has been determined that the production of battery separator by paper-making techniques from a furnish of glass fibers and silica powder leads to problems which are caused by variations in the concentration of the silica powder in the furnish. Typical glass fiber furnishes have a liquid content exceeding 98 percent w/w. In the course of making separator sheets, most of the water is removed from the furnish in the first few feet of a screen on which the furnish is cast. The water, known as white water, is recycled and winds up back in the headbox of the machine. If the furnish is composed exclusively of glass fibers, virtually none of the fibers pass through the wire and wind up in the white water. However, furnishes comprising glass fibers and silica powder do not fare so well. In the absence of a retention aid, significant amounts of silica powder from such furnishes do pass through the paper making wire and wind up in the white water. Left unchecked, this phenomenon causes the concentration of silica powder in the furnish to increase, undesirably changing the properties of the furnish. Heretofore, the problem of silica powder and the like passing through a paper making wire has been avoided through the use of binders as retention aids.

U.S. Pat. No. 2,477,000 discloses a synthetic fiber paper produced from fibrillae and fibers made by methods wherein a solution of the fiber is extruded through very small orifices (spinnerets) and then the extruded solution is allowed to congeal either in a precipitating bath or by evaporation of the solvent or by temperature changes (see column 2, lines 25 and following). The patent says that fibers of cellulose acetate, cellulose nitrate, regenerated cellulose from viscose, "Vinylite (a synthetic resin made by polymerization of vinyl compounds), Aralac (a fibrous product made from skim milk casein), and spun glass" which range in length from ⅛ inch to 1 inch and in diameter from 12–80 microns and fibrillae preferably derived from flax, Manila hemp, caroa or hemp can be used to make the paper. At least 90 percent of the fibrillae should be from 0.0015 to 0.0025 inch in length and from 0.0000027 to 0.0000044 inch in width.

BRIEF DESCRIPTION OF THE INSTANT INVENTION

The instant invention is based upon the discovery that a binderless glass fiber mat suitable for use as a separator for Valve regulated ("sealed"—"recombinant") lead acid (VRLA) batteries can be produced by a dry process by collecting the fibers from fiberizing apparatus, without subjecting them to a wet paper making process. For example, glass fibers produced by the flame blown process, which is subsequently described in more detail, can be wound on a drum until a mat weighing about 1,000 grams per square meter has been collected; the mat can then be slit transversely, and removed from the drum as sheets weighing about 1,000 grams per square meter, having one dimension which equals the circumference of the drum, and another which equals the width of the drum. This mat which, in a typical example, has an average fiber diameter of 0.8 $\mu$m, can then be separated into layers having the weight in grams per square meter desired in a given battery separator, and the layers can be cut to size and used as separators, as subsequently described in more detail.

A glass fiber mat which can be used in practicing the instant invention can also be made by what is called "the rotary process" in glass forming apparatus which includes a glass melting tank, a rapidly rotating centrifugal bushing with small openings in a periphery, at least one high pressure hot gas nozzle from which a high velocity fiberizing jet is directed across the periphery of the centrifuge, and a collecting conveyor. Molten glass fed to the centrifugal bushing is caused by centrifugal force to flow through the peripheral openings of the bushing into the fiberizing jet, by which the streams of glass are attenuated and carried onto a collecting conveyor which is pervious to the gas. The mat from this process can also be collected on a drum, slit transversely, and removed from the drum as sheets which, again can weigh about 1,000 grams per square meter, and can be composed of fine fibers, average fiber diameter 0.8 $\mu$m. This mat can also be separated into layers having the weight in grams per square meter desired in a given battery separator, and the layers can be cut to size and used as separators, as subsequently described in more detail.

A thinner sheet of the glass fiber mat can also be produced by collecting fibers made either the flame blown process or by the rotary process until enough fibers have been collected to provide a mat having a desired grammage, which can range broadly from about 20 to about 1000 g.m$^{-2}$, and then cut to size. To produce the thinner sheets, glass fibers can be produced from softened glass and collected in a conventional manner, usually on a foraminous conveyor, and the speeds of the fiberizing process and of the conveyor can be set so that a mat having the desired grammage is conveyed from the forming operation, and either rolled for future use, or cut to size, in which case it can be used immediately to produce batteries, or stacked for future use. It may be desirable in some situations to produce battery separator by overlaying a plurality of such sheets.

When a battery is produced, at least one stack of alternating positive and negative plates is assembled, with separator between adjacent plates, and the separator of each stack is compressed so that the stack can be slipped into a pocket which is a part of the case of the battery. It is important that the separator have sufficient resiliency, after such compression, that it exerts the required pressure against the paste or active material on each plate to force the paste into contact with the plate, and to cause a pressure between the plates, ensuring that there is an interface, along the faces of the plates, among the plate paste or active material, the electrolyte and oxygen. A standard test has been developed to measure the resiliency of a separator material. The results of this test, as is subsequently explained in more detail, indicate that separators in batteries according to the invention are significantly more resilient than otherwise identical separators made from different samples of the same glass fibers, but by a conventional wet paper making process.

OBJECTS OF THE INVENTION

It is, therefore, an object of the instant invention to provide an improved VRLA or other battery containing a separator composed, at least predominantly, of glass fibers as collected from a fiber forming process, i.e., without having been subjected to a wet paper making process.

It is another object to provide a method for producing a battery separator composed predominantly of glass fibers.

It is yet another object to provide a glass fiber VRLA separator which has better resiliency than a separator made by the wet paper making process from the same fibers.

It is a further object to provide a glass fiber VRLA separator which has greater absorbency for a battery electrolyte than does a separator made by the wet paper making process from the same fibers.

It is still another object to provide a glass fiber VRLA separator material in which the average fiber length is greater than in a separator made by the wet paper making process from the same fibers because the fiber breakage associated with the paper making process does not occur.

It is a further object to provide a glass fiber VRLA separator which has a lower grammage or weight and a higher porosity, at the same BCI thickness, than a prior art VRLA separator made from a prior art wet papermaking process.

Other objects and advantages will be apparent from the description which follows, reference being made to the attached drawings.

DEFINITIONS

Subsequently herein, the term "percent v/v" means percent by volume; the term "percent w/w" and the symbol % mean percent by weight; the term "wire", as applied to a paper making machine, means the surface of the machine on which a furnish is cast in producing paper, and can be, for example, the screen of a Fourdrinier machine or the vacuum drum of a rotoformer machine; pore sizes reported herein, unless otherwise indicated, are in microns, and are determined by the first bubble method or by liquid porosimetry, Coulter; all temperatures are in °C.; and the following abbreviations have the meanings indicated: $\mu$m=micron or microns; mg=milligram or milligrams; g=gram or grams; kg=kilogram or kilograms; l=liter or liters; ml=milliliter or milliliters; cc=cubic centimeter or cubic centimeters; pcf=pound per cubic foot or pounds per cubic foot; m=meter or meters; cm=centimeter or centimeters; mm=millimeter or millimeters; m=meter or meters; mil=inch×$10^{-3}$ or inches×$10^{-3}$ (multiply times 25.4 to convert to mm); kPa=pressure in thousands of Newtons per square meter; psi=pounds per square inch (multiply times 6.89 to convert to kPa); and kN=force in thousands of Newtons.

BRIEF DESCRIPTION OF THE DRAWINGS

FIGS. 2 and 2a are vertical sectional views which show different parts of apparatus for producing a glass fiber mat by what is called "the rotary process" that can be used as collected from the fiber forming process, i.e., without having been subjected to a wet paper making process, to produce a battery according to the invention; together, FIGS. 2 and 2a constitute a schematic representation of the apparatus.

DESCRIPTION OF THE PREFERRED EMBODIMENTS

Figure 1:
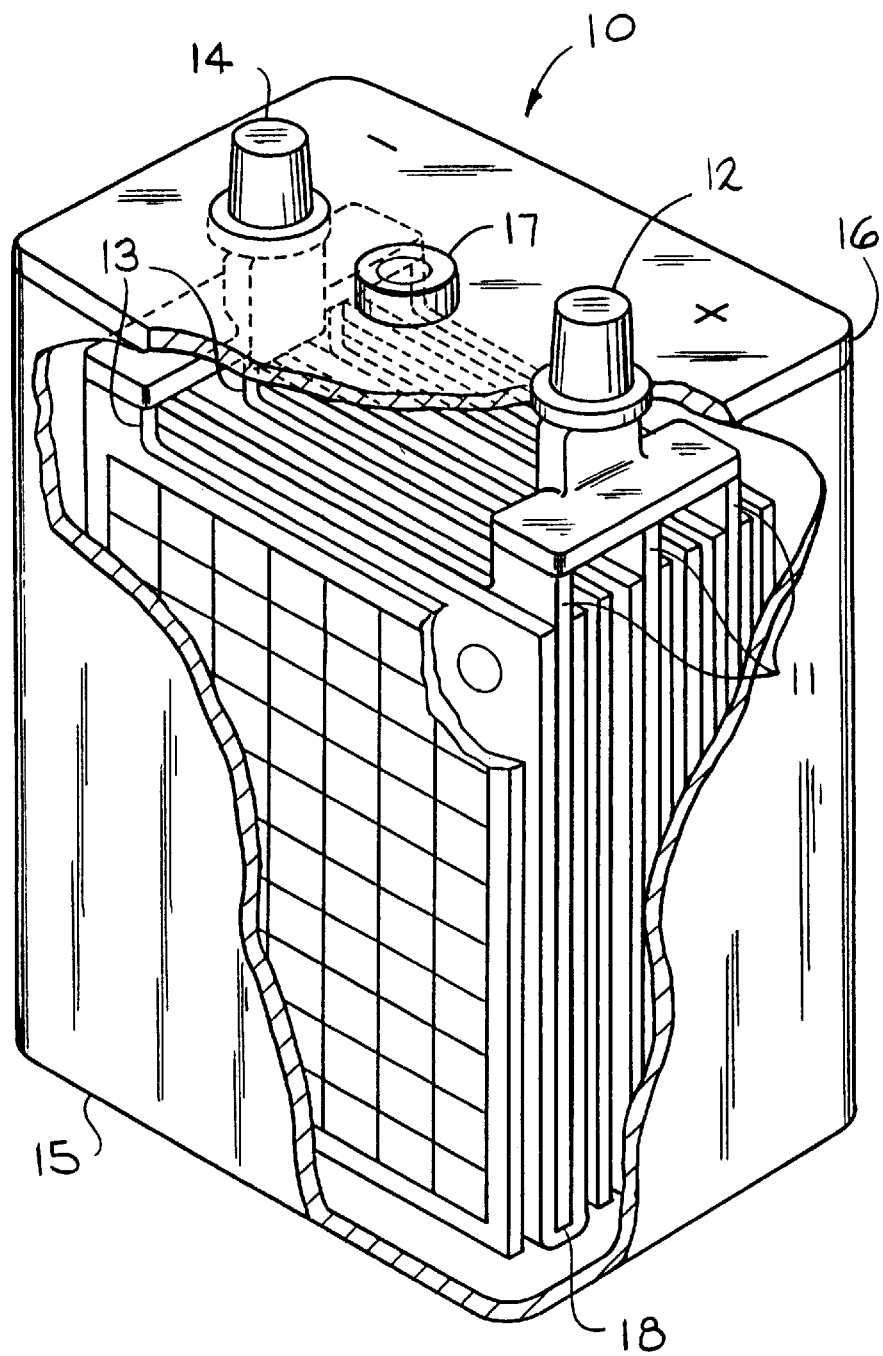
FIG. 1 is a perspective view with parts broken away to show details of construction of a VRLA battery according to the invention.

A single cell battery according to the invention with a total of eight plates is indicated generally at 10 in FIG. 1. Except for the identity of the separator material therein, the battery 10 is conventional; the separator can be used in other otherwise conventional batteries. The battery 10 comprises four positive plates 11 which are electrically connected to a positive terminal 12 and four negative plates 13 electrically connected to a negative terminal 14. The plates 11 and 13 are housed within a battery case 15 which is covered by a top 16. There is an opening through a boss 17 on the top 16 of the battery. Separators 18 are composed of sheets of separator material wrapped around the bottom and both major faces of each positive plate 11.

In a specific example, the separator material in the battery 10 was composed of glass fibers collected, as the fibers were formed, into a mat weighing about 280 g.m$^{-2}$; the fibers had an average diameter of substantially 0.8 $\mu$m. A control battery was also produced using a separator that is commercially available under the designation BG 28005; this material, which is made by the wet paper making process, weighs 280 g.m$^{-2}$.

Figure 5:
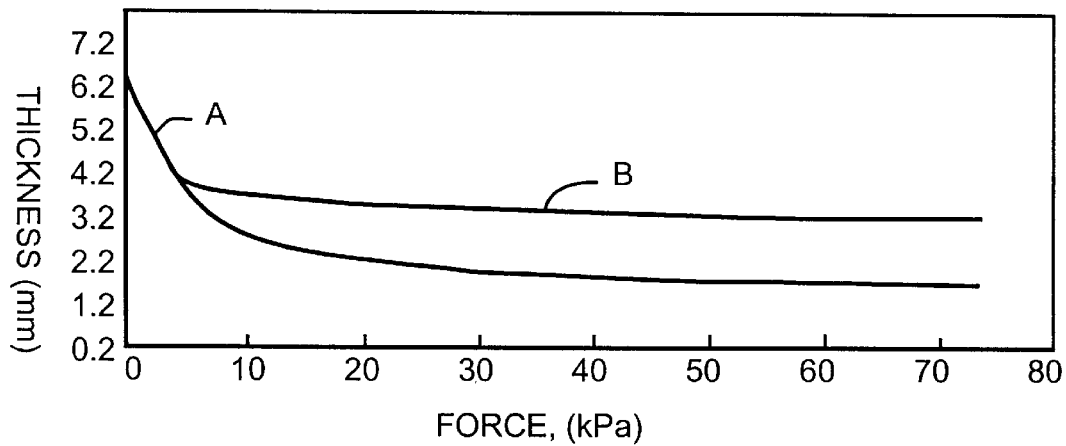
FIGS. 5 and 7 are plots of thickness of a separator in mm when compressed (the compression curve) vs. force in kPa applied to compress the separator to that thickness and of rebound thickness in mm (the rebound curve) vs. force applied before rebound thickness was determined for separator materials that can be used in batteries according to the invention.

In another specific example, a glass fiber mat was produced which weighed 1000 g.m$^{-2}$ and was composed of fibers having an average diameter of substantially 0.8 $\mu$m; a layer which weighed 318 g.m$^{-2}$ was separated from this mat, and was subjected to "Compression" and "Rebound" testing as described below. This separator can also be used in the battery 10. The "Compression" and "rebound" of the separator involved determining compression thicknesses by the method described in U.S. Pat. No. 5,336,275 under various applied loads, and after the excess of each applied load above 3.79 kPa was released; the former measurements are the "Compression" thicknesses while the latter are "rebound" thicknesses. The average results are presented graphically in FIG. 5, which is a plot of the thicknesses of the separator 18 in mm (Compression) at various applied loads in kPa and of the thicknesses in mm (Rebound) after the excess above 3.79 kPa of each applied load was released. Each data point for one of the curves of FIG. 5 is indicated by "+" (this is the curve for "rebound" thickness) and each data point for the other curve is indicated by a dot (this is the curve for "Compression" thicknesses). The data plotted in FIG. 5 indicate that the separator is an outstanding material. Compression and rebound thicknesses were determined for a commercially available separator material that is produced by a wet process using paper making equipment. The material tested is available under the trade designation HOVOSORB BG 30005, grammage 318 g.m$^{-2}$. The average results of this testing are presented graphically in FIG. 6, which is a plot similar to FIG. 5, showing the data plotted in FIG. 5 and the Compression thicknesses of the HOVOSORB BG30005 separator in mm and the Rebound thicknesses in mm against the applied load in kPa.

Figure 6:
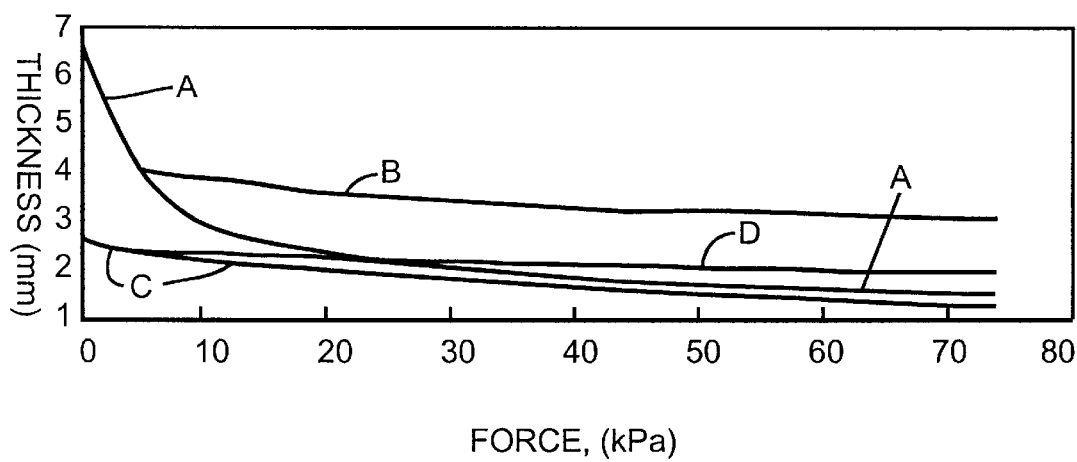
FIGS. 6 and 8 are plots of the data represented in FIGS. 5 and 7 and, in addition, plots of thickness of a separator in mm when compressed vs. force in kPa applied to compress the separator to that thickness and of rebound thickness in mm vs. force applied before rebound thickness was determined for commercial separator materials that have been used in batteries.
Figure 7:
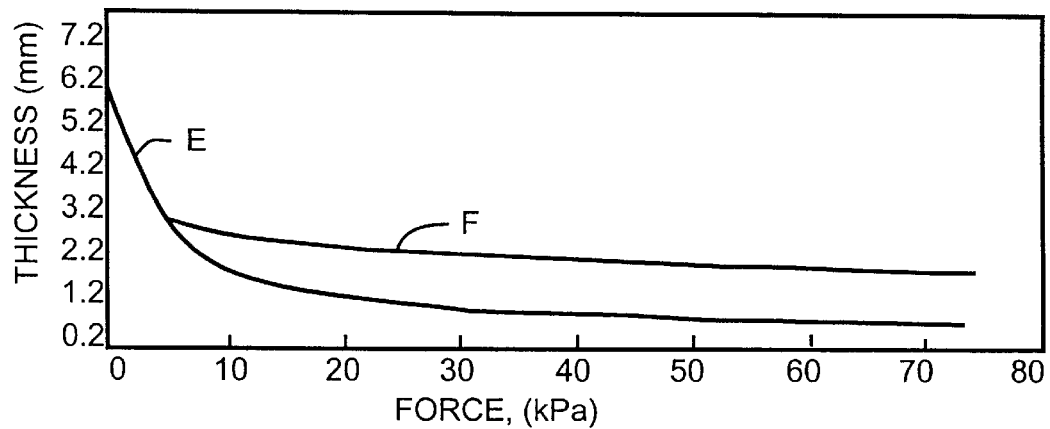
Figure 8:
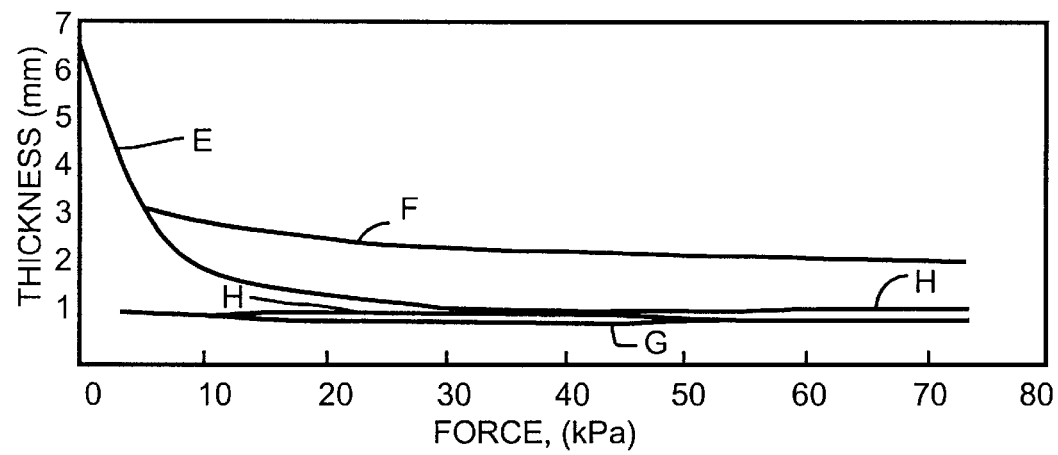

In a third specific example, a glass fiber mat was produced which weighed 1000 g.m$^{-2}$ and was composed of fibers having an average diameter of substantially 0.8 $\mu$m; a layer which weighed 130 g.m$^{-2}$ was separated from this mat, and was subjected to "Compression" and "Rebound" testing. This separator can also be used in the battery 10. The average results of the testing are presented graphically in FIG. 7, which is a plot of the Compression thicknesses of the separator in mm and of the rebound thicknesses in mm against the applied load in kPa. The data points for one of the curves of FIG. 7 are shown by plus marks (these are the data points for the "Rebound" curve), while those for the other curve are indicated by dots (these are for the "compression" curve). The data plotted in FIG. 7 indicate that the separator is an outstanding material. Compression and rebound thicknesses were determined for a another separator material that is commercially available, this one under the trade designation BGC14065, grammage 130 g.m$^{-2}$. The average results of the BGC14065 material are presented graphically in FIG. 8, which is a plot similar to FIG. 6, showing the data plotted in FIG. 7 and the compression thicknesses of the BGC14065 separator in mm and of the rebound thicknesses in mm against the applied load in kPa. The data points for one of the BGC14065 curves are shown by open circles (these are the data points for the "Rebound" curve), while an * indicates each data point for the other BGC14065 (these are the "compression" curves).

Figure 9:
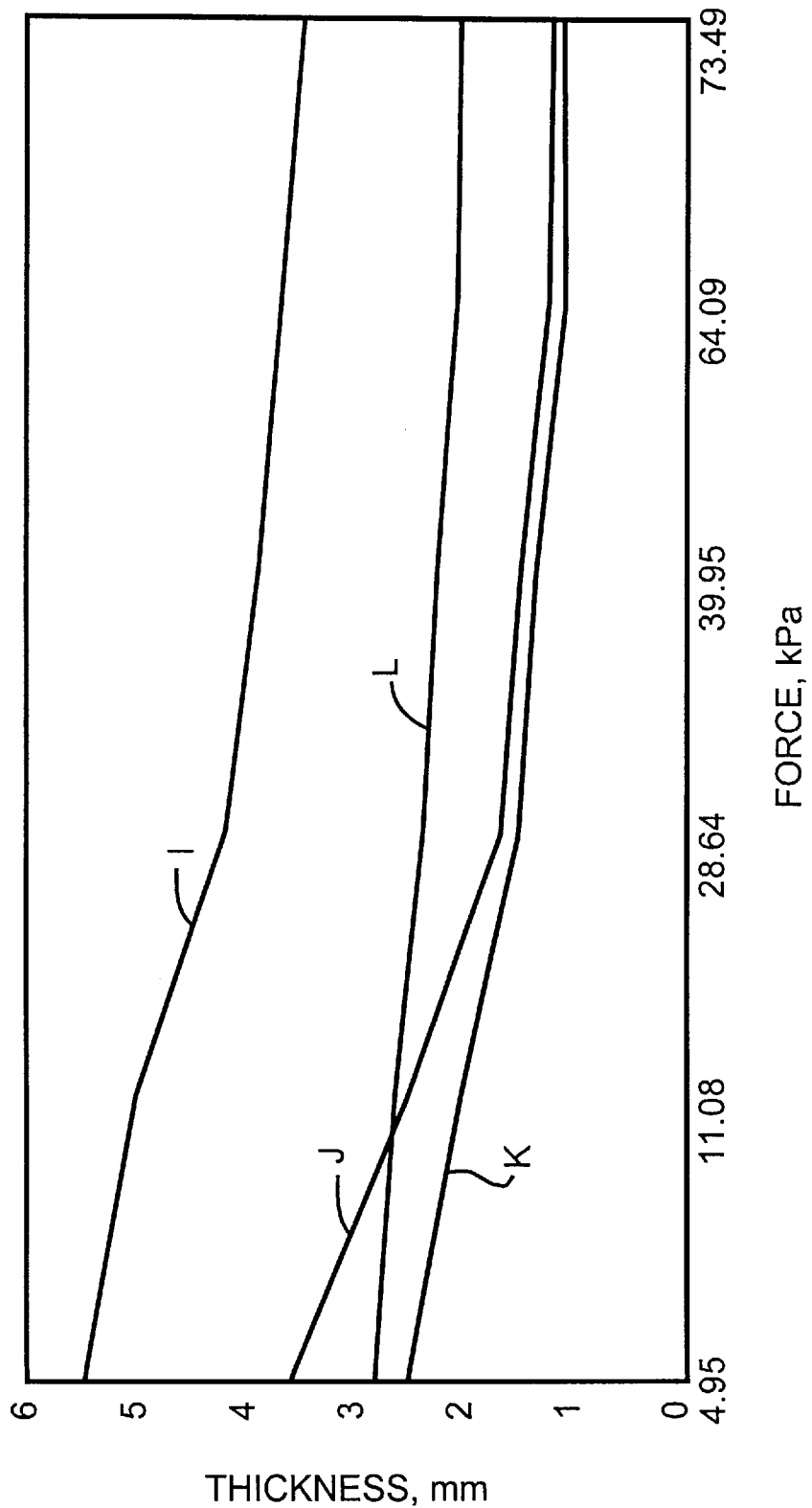
FIG. 9 is a plot similar to FIGS. 6 and 8 of thickness of a separator in mm when compressed vs. force in kPa applied to compress the separator to that thickness and of rebound thickness in mm vs. force applied before rebound thickness was determined, in one case for separator material that can be used in a battery according to the invention and, in another, for a commercial separator material that has been used in batteries.

In a fourth specific example, a glass fiber mat was produced which weighed 1000 g.m$^{-2}$ and was composed of fibers having an average diameter of substantially 0.8 $\mu$m; a layer of "drylaid separator" which weighed 258 g.m$^{-2}$ was separated from this mat, and was subjected to "Compression" and "Rebound" testing. This separator can also be used in the battery 10. The average results of the testing are presented graphically in FIG. 9, which is a plot of the Compression thicknesses of the separator in mm and of the rebound thicknesses in mm against the applied load in kPa. The data points for one of the curves of FIG. 9 are shown by equilateral triangles (these are the data points for the "Rebound" curve), while those for the other curve are indicated by squares (these are for the "compression" curve). The data plotted in these two curves indicate that the separator is an outstanding material. Compression and rebound thicknesses were also determined for a another separator material ("wetlaid separator") that was made from the same fibers by a wet paper making process. This separator had a grammage 244 g.m$^{-2}$. The average results of the wetlaid separator testing are also presented graphically in FIG. 9, the data points for one of the wetlaid separator curves are shown by open stars (these are the data points for the "Rebound" curve), while a five sided figure indicates each data point for the other wetlaid separator curve (these are for the "compression" curves). The layer which weighed 258 g.m$^{-2}$ that was separated from the mat was found to be capable of absorbing approximately 18 times its weight of a sulfuric acid electrolyte, while the wetlaid separator was absorbing only about 12 times its weight of the same electrolyte.

Preliminary testing indicates that a battery which required separator made by the wet papermaking process weighing 300 g.$^{-2}$ would perform satisfactorily if made with "drylaid separator" weighing 240 g.m$^{-2}$ and, further, that the "drylaid separator" would absorb more electrolyte than the higher grammage material made by the wet papermaking process.

Compression and rebound testing of other separator materials composed of the 608 MF mat which ranged in grammage from 130 to 1151 g.m$^{-2}$, indicated that they are all outstanding separator materials.

It has been considered desirable for glass fiber separator material used in VRLA batteries to contain a substantial proportion of fine fibers, e.g., finer than about 5 $\mu$m. The separators, if they contain a sufficient proportion of fine fibers, are capable of holding enough of the relatively small amount of electrolyte that is used in such batteries to make contact with the plates, and to enable an electric current to flow through the separators. It is usually desirable that the separators also contain a substantial proportion of coarser fibers in order to impart strength and, incidentally, to reduce the cost per pound. The finest presently known glass fibers have been produced by the flame blown process, for example, that shown in FIGS. 3 and 10, attached, and described herein with reference thereto. The apparatus that was used to produce the glass fiber mats from which separator material for the battery 10 was separated, as described above is that of FIG. 10. Accordingly, the flame blown process has been used to produce separator material for a battery according to the invention. The flame blown process, as is known, if such variables as the temperature and velocity of the blast of hot gases that attenuates the glass filaments which are drawn from a melting tank are suitably varied, can also be used to produce fibers that are either coarser or finer than 0.8 $\mu$m in diameter.

Figure 2:
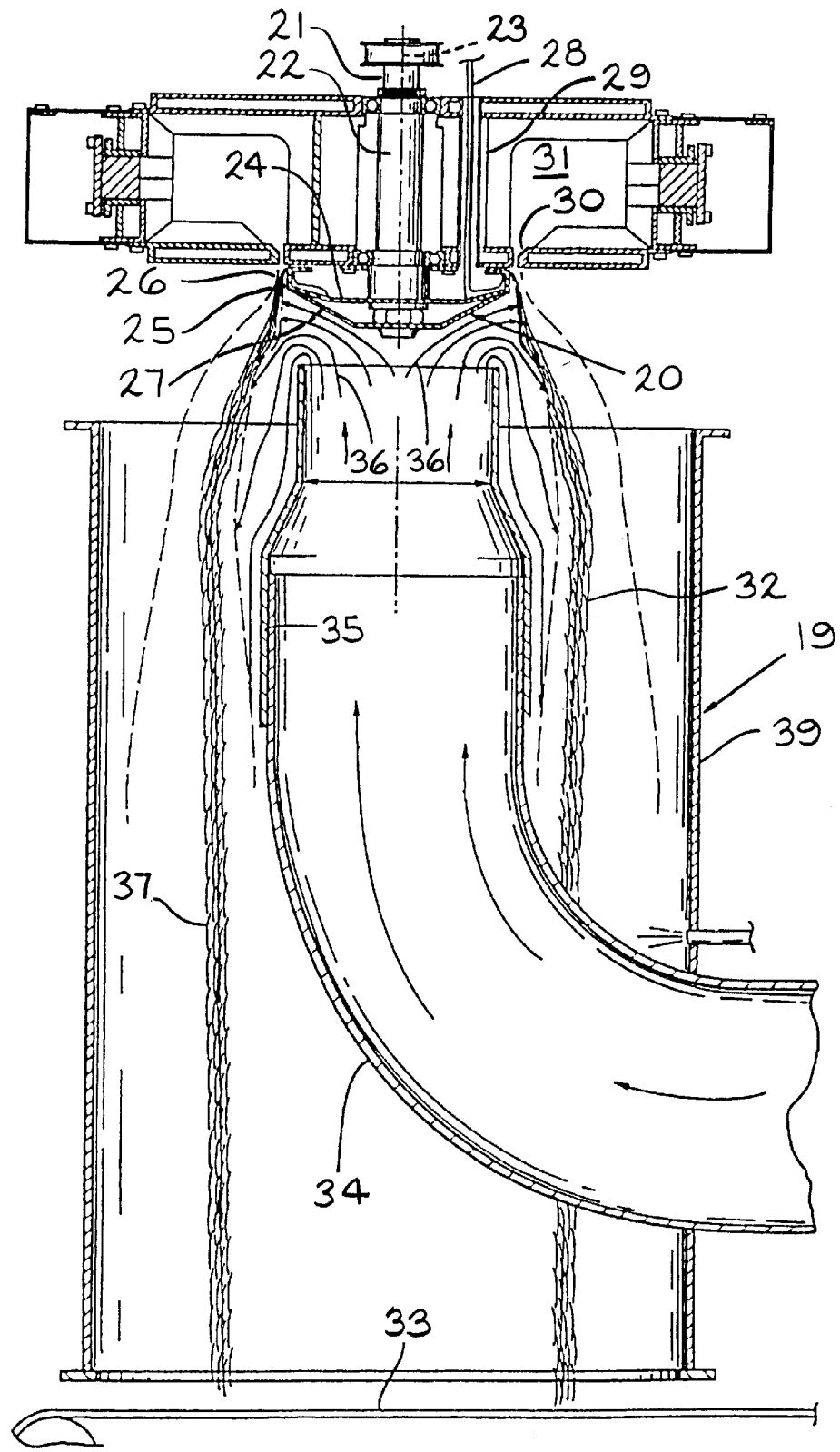

FIGS. 2 and 2a show apparatus which can be used to produce battery separator material composed of first glass fibers having a first average fiber diameter and second glass fibers having a second average fiber diameter. The apparatus has two different fiberizers, one of which is indicated generally at 19, and the other of which is indicated generally at 19'. The two fiberizers 19 and 19' are identical; each includes a spinner assembly 20, 20' carried by a rotatable spindle 21, 21' which can be rotated at high speed about its longitudinal axis 22, 22' by a motor (not illustrated) which drives a belt-driven pulley 23, 23' that is keyed to the upper end of the spindle 21, 21'.

Each of the spinner assemblies 20, 20' includes an internal bowl 24, 24' which rotates with the spindle 21, 21'. Each bowl 24, 24' has a peripheral wall 25, 25' through which there are several small diameter openings 26, 26'.

Each spinner assembly 20, 20' also has an insulating heat shield 27, 27' which minimizes heat loss from the bowl 24, 24'.

As each spinner assembly 20, 20' is rotated, molten glass 28, 28' flows from a melting tank (not illustrated) through a tube 29, 29' into one of the bowls 24, 24' from which centrifugal force causes streams of the glass to flow through the openings 26, 26'.

An annular nozzle 30, 30' surrounds each of the spinner assemblies 20, 20'. Combustion of a fuel gas in a chamber 31, 31' forces a jet of heated gas to flow downwardly through the nozzles 30, 30'.

The gas jets flowing from the nozzles 30, 30' attenuate streams of molten glass which flow through the openings 26, 26' into fine fibers 32, 32' and direct them downwardly onto a conveyor 33, 33' where they collect as a mat.

Each fiberizer 19 and 19' also includes a riser tube 34, 34' which is connected to a source for compressed air (not illustrated) and to an end tube 35, 35' which extends vertically upwardly, and terminates just below the heat shields 27, 27'. As is indicated by arrows 36, 36', air flows upwardly through the riser tubes 34, 34' and the end tubes 35, 35' until it is deflected outwardly by the spinner assembly against the interior of a veil 37, 37' of fibers.

The fiberizers 19 and 19' are disclosed in U.S. Pat. No. 5,076,826, which explains that the upward flow of air indicated by the arrows 36, 36' prevents a low pressure zone beneath the spinner assemblies 20, 20', and, as a consequence, reduces the amount of remelt which forms in the fiber veils 37, 37'. The patent also discloses that the fiberizers, except for the parts thereof which cause the upward flow of air, was prior art.

The apparatus of FIGS. 2 and 2a can be operated to produce separator material for use in batteries according to the invention. For example, the fiberizers 19 and 19' can both be operated to produce fibers having an average diameter of 0.8 $\mu$m, in which case the speed of the conveyors 33 and 33' can be controlled so that a mat 38 having the desired grammage is accumulated on the conveyors before it is conveyed from within the housing 39' for delivery to an upwardly inclined conveyor 40 and collection on a take-up roll 41. Ultimately, the mat 38 can be slit to width and used, for example, as described in U.S. Pat. No. 5,344,466 to produce batteries.

Alternatively, the fiberizer 19 can be operated to produce fibers having an average diameter of 0.8 $\mu$m, and the fiberizer 19' can be operated to produce fibers having a larger fiber diameter, say 1.5 $\mu$m, and the speed of the conveyors 33 and 33' can be controlled to provide mat having a desired grammage and a desired proportion of fibers of the two diameters. Since it is usually desirable that the finest fibers of a separator be adjacent the plates of a battery, two layers of the separator described in this paragraph can be placed on top of one another, with their coarse fiber sides adjacent one another, to provide a particularly advantageous separator material.

Another apparatus (not illustrated) that can also be used to produce separator material composed of two outer layers of fine fibers and a center layer of coarser fibers comprises the apparatus of FIGS. 2 and 2a plus a third fiberizer, identical to the fiberizers 19 and 19' which is positioned between the two so that it deposits fibers on a mat that has already been formed in the fiberizer 19 and the fiberizer 19' deposits fibers on the mat discharged by the third fiberizer. In this case, the fiberizers 19 and 19' are preferably operated to produce fine fibers, and the third fiberizer is operated to produce coarser fibers.

Figure 3:
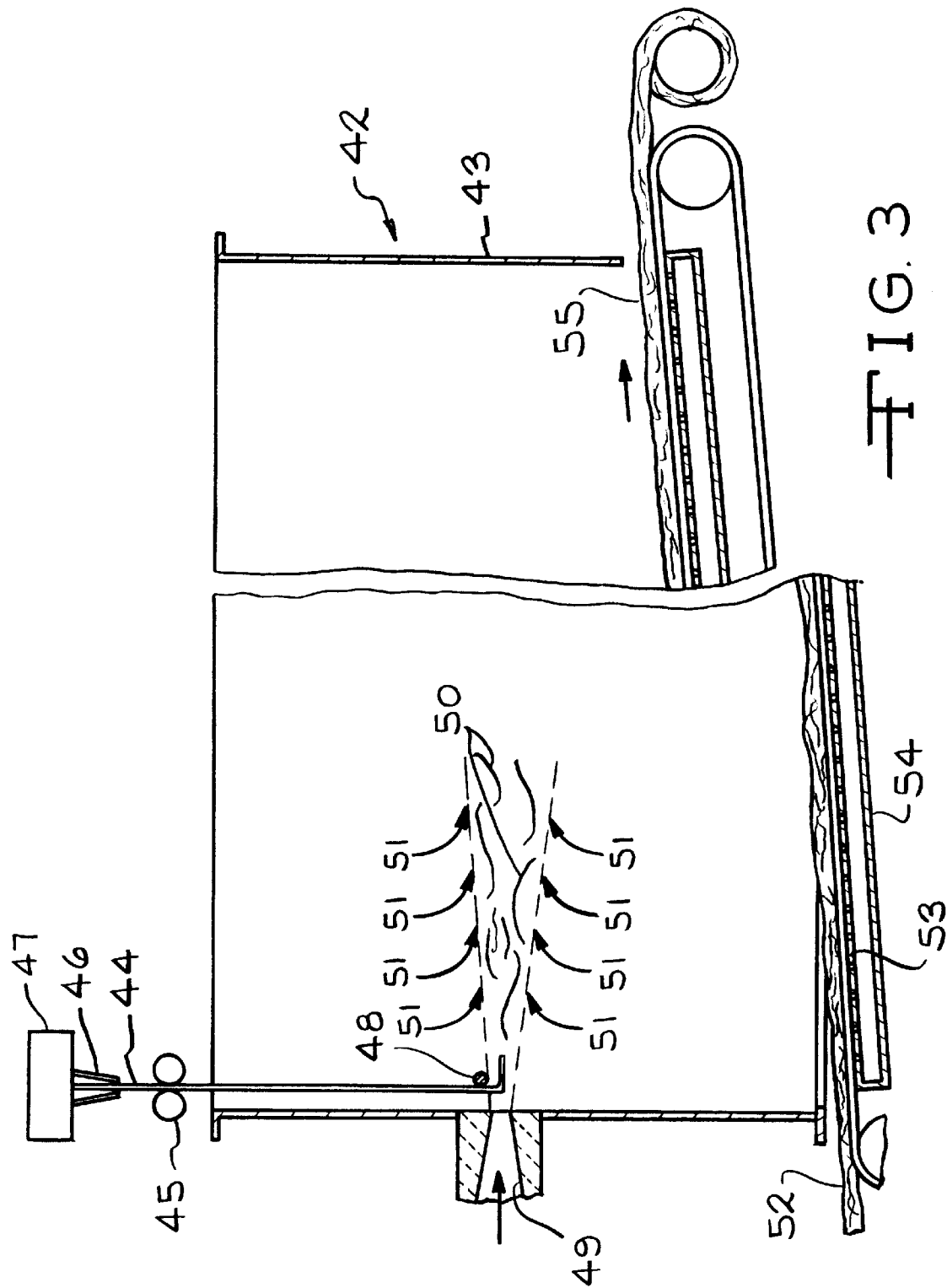
FIG. 3 is a schematic representation similar to a part of the apparatus of FIG. 2a, showing different apparatus which can be used to produce a glass fiber mat by what is called "the flame blown" process; the apparatus of FIG. 3 can be used alone to produce a mat or with the apparatus of FIG. 2 to produce a glass fiber mat that can be used as collected from the fiber forming process to produce a battery according to the invention.

Referring to FIG. 3, still another apparatus that can be used in producing separator material that can be used in a battery according to the invention is indicated generally at 42. The apparatus 42 comprises a fiber collection zone 43 in which primary filaments 44 drawn by pull rolls 45 from a fiber forming bushing 46 in a glass melting tank 47 pass over a filament support 48 and into a blast of hot gases from a high pressure hot gas nozzle 49. The blast of hot gas softens the filaments, attenuates them into fine fibers 50, and projects them to the right inside the collection zone 43. As is indicated by arrows 51, atmospheric air can enter the region where the fibers 50 are projected. A glass fiber mat 52, which can be one discharged from the fiberizer 19 enters the collection zone 43 on a conveyor 53, which passes over a suction box 54, holding the mat 52 in contact with the conveyor 52, and drawing fibers 50 to the bottom of the collecting zone 43 and onto the mat 52 and a mat 55 which forms inside the collection zone as fibers 50 are deposited, first, onto the mat 50, and then onto fibers 50 that have previously been so deposited.

The mat 55 can be conveyed into the fiberizer 19' for augmentation, or it can be slit, stacked, and used as previously described to produce a battery according to the invention, or it can be wound on a roll for subsequent processing.

Figure 4:
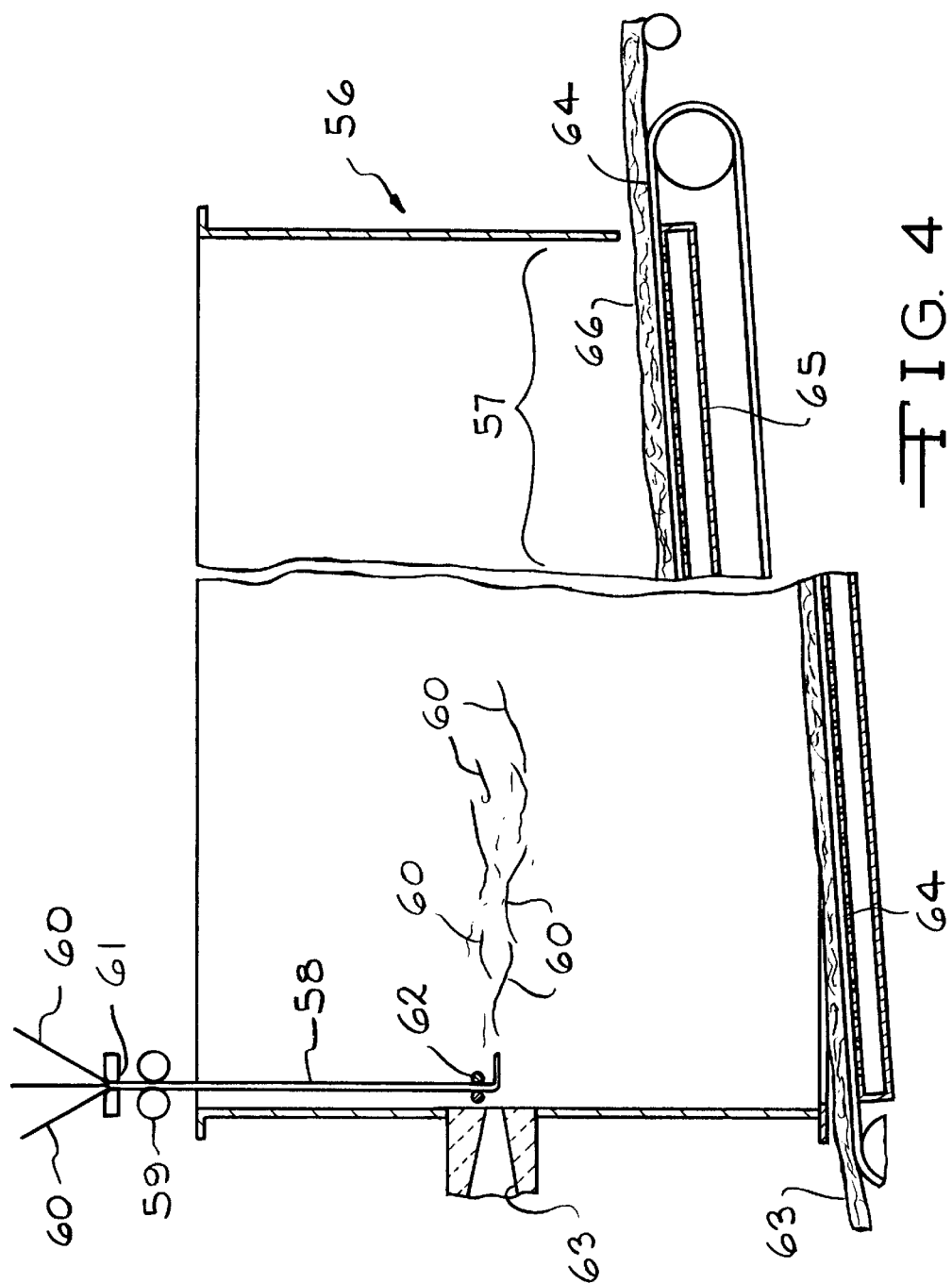
FIG. 4 is a schematic representation similar to FIG. 3 of still another apparatus which can be used with that of FIG. 2 for producing a glass fiber mat that can be used as collected from the fiber forming process to produce a battery according to the invention.

Referring to FIG. 4, still another apparatus that can be used in producing separator material that can be used in a battery according to the invention is indicated generally at 56. The apparatus 56 comprises a fiber collection zone 57 in which a strand 58 of textile glass fibers is drawn by pull rolls 59 to pull individual fibers 60 from a textile fiber bushing (not illustrated) in a glass melting tank (not illustrated), through a gathering shoe 61 and to second pull rolls 62 by which it is directed into a blast of gases from a high pressure gas nozzle 63. The blast of gas breaks up the strand 58, and projects the fibers 60 to the right inside the collection zone 57. A glass fiber mat 63, which can be one discharged from the fiberizer 19 enters the collection zone 57 on a conveyor 64, which passes over a suction box 65, holding the mat 63 in contact with the conveyor 64, and drawing fibers 60 to the bottom of the collecting zone 57 and onto the mat 63 and a mat 66 which forms inside the collection zone as fibers 60 are deposited, first, onto the mat 63, and then onto fibers 60 that have previously been so deposited.

The mat 66 can be conveyed into the fiberizer 19' for augmentation, or it can be slit, stacked, and used as previously described to produce a battery according to the invention, or it can be wound on a roll for subsequent processing.

The apparatus of FIGS. 2 and 2a can also be used to produce a multilayer separator material, e.g., by operating the fiberizing apparatus 19 of FIG. 2 to deposit a mat composed of a thin layer of fine fibers on the conveyor 33, advancing this thin layer of mat into the fiberizing apparatus of FIG. 2a and depositing additional fibers and silica on top of the thin layer of mat. The fibers can be deposited in the apparatus of FIG. 2a as previously described, and an aqueous slurry of the silica can be fed at a suitable rate to a rotating dish 67 with veins 68 so that the slurry is thrown outwardly by centrifugal force in the dish 67 and then projected radially outwardly by the veins 68 into the veil 37. Any of the slurry that falls onto the thin layer of the mat on the conveyor 33' is merely collected there, becoming a part of the separator material just like that which impinges on the veil 37.

Similarly, the apparatus of FIGS. 2 and 2a can be used to produce still another multilayer separator material, e.g., by operating the fiberizing apparatus 19 of FIG. 2 to deposit a mat composed of fine fibers on the conveyor 33, advancing this layer of mat into the fiberizing apparatus of FIG. 2a and depositing additional fibers and a concentrated slurry of extremely fine cellulose fibrils on top of the layer of mat. The fibers can be deposited in the apparatus of FIG. 2a as previously described, and an aqueous slurry of the cellulose fibrils can be fed at a suitable rate to a rotating dish 67 with veins 68 so that the slurry is thrown outwardly by centrifugal force in the dish 67 and then projected radially outwardly by the veins 68 into the veil 37. Any of the slurry that falls onto the thin layer of the mat on the conveyor 33' is merely collected there, becoming a part of the separator material just like that which impinges on the veil 37. There can also be a dish (not illustrated) in the fiberizer 19 of FIG. 2, which can be operated as just described to introduce cellulose fibrils into the fibers formed in the fiberizer 19.

Figure 10:
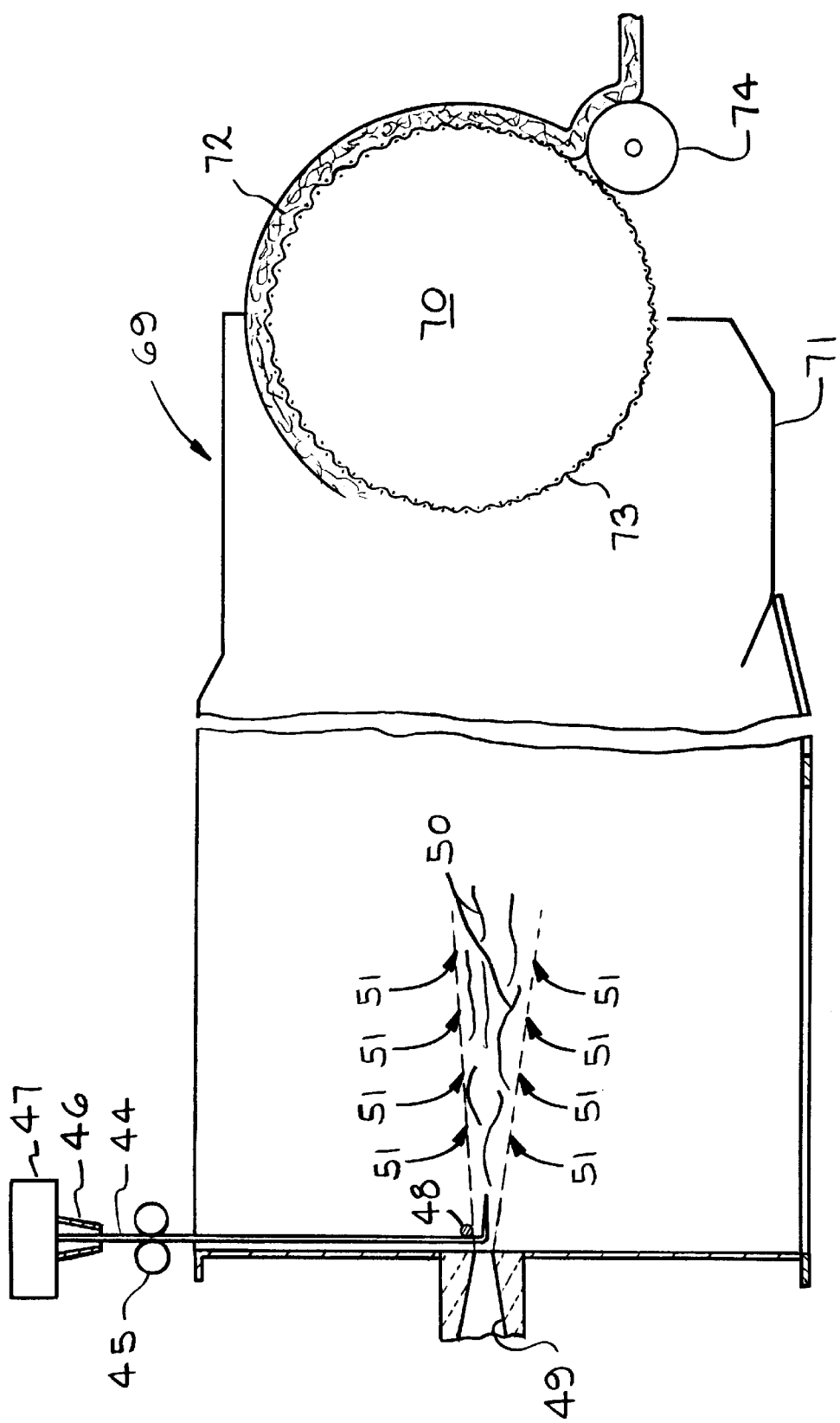
FIG. 10 is a schematic representation of apparatus similar to that shown in FIG. 3, showing apparatus which can be used to produce a glass fiber mat by what is called "the flame blown" process, but with a different collecting system.

FIG. 10 shows apparatus similar to that shown in FIG. 3 except that fibers entering the collection zone 43 are collected on a drum collector 80 in a layer 81. The drum collector has a foraminous outer surface 82 and a vacuum is drawn through that surface, drawing fibers onto the surface 82. The drum collector 80 may be rotated fast or slowly. If rotated fast, the drum collector 80 may be rotated numerous times, causing a layer 81 of fibers to build up on the surface 82. A transverse cut is made to the layer 81, when a desired thickness is achieved and, as indicated, a sheet comprising the layer of glass fibers is removed and can be stacked. If rotated slowly, the collector may be rotated once, building up a single layer on the surface 82.

Glass fiber mat with cured binder bonding individual fibers to one another at points of contact can also be used in lead acid batteries where the plates are flooded with electrolyte. Binders can also be associated with the fibers in the collection portions of the apparatus of FIGS. 2, 2a, 3 and 10 at points where there is still sufficient heat available for cure. The most common binders used for this purpose are of the phenol/formaldehyde type because they can be applied from aqueous systems, and are not expensive. Such binders are suitable for use in practicing the instant invention.

It will be appreciated that the instant invention, as described above, may be subjected to various modifications without departing from the spirit of the invention disclosed and claimed herein. For example, separator according to the invention and comprised of a plurality of sheets or layers may be needled or sewn together to provide added physical integrity for the separator. Additionally or alternatively, layers of material can be cross-lapped. In addition, additives which do not affect the essential characteristics of the separator may be incorporated.

I claim:

1. In a storage battery comprising a plurality of lead plates in a closed case, a fibrous sheet plate separator between adjacent ones of said plates, and a body of a sulfuric acid electrolyte absorbed by each of said separators and maintained in contact with each of the adjacent ones of said plates, the improvement wherein said separator sheets consist essentially of intermeshed glass fibers produced by suspending glass fibers in a gaseous medium, collecting the suspended glass fibers on a foraminous material, and separating the collected fibers from the foraminous material, with the proviso that the fibers suspended and collected have a BET surface area of from 0.2 to 5 $m^2$ per gram.

2. A glass fiber separator material which is a mass of intermeshed glass fibers produced by suspending glass fibers in a gaseous medium, spraying an aqueous slurry containing from 0.2 percent w/w to 20 percent w/w of cellulose fibrils, based upon the weight of glass fibers and cellulose fibrils, into contact with the suspended glass fibers, said fibrils being from a slurry having a Canadian freeness sufficiently low that the separator material has a tensile strength greater than an otherwise identical separator where glass fibers having an average diameter greater than 1 $\mu$m replace the cellulose fibrils, collecting the suspended glass fibers and the cellulose fibrils on a foraminous material, and removing the separator material from the foraminous material, with the proviso that the glass fibers suspended and collected have a BET surface area of from 0.2 to 5 $m^2$ per gram.

3. A glass fiber separator material as claimed in claim 2 wherein the cellulose fibrils and glass fibers are impregnated with a synthetic latex.

4. A glass fiber separator material as claimed in claim 2 wherein the cellulose fibrils are from a slurry which has a Canadian freeness not greater than 100 cc.

5. A glass fiber separator material as claimed in claim 2 wherein the cellulose fibrils adjacent one of the two opposed major surfaces are impregnated with a solidified, synthetic latex, while the cellulose fibrils adjacent the other of the two opposed major surfaces are not so impregnated.

6. A multi-layer sheet useful as a separator in a valve regulated lead acid battery, said sheet comprising at least a first layer and a second layer, said sheet being produced by the method consisting of the steps of forming said first layer by suspending glass fibers in a gaseous medium, collecting a mat of the glass fibers on a foraminous material, forming said second layer by suspending glass fibers and a powder that is inert to battery reactions in a gaseous medium, collecting the glass fibers and the powder on said first layer, said powder having a mean particle size ranging from 0.001 $\mu$m to 20 $\mu$m, said first layer having a sufficiently small pore size that substantially all of the powder is collected on said first layer and is retained in the multi-layer sheet, and removing the separator material from the foraminous material, with the proviso that the BET surface area of the fibers suspended and collected is from 0.2 to 5 $m^2$ per gram.

7. A multi-layer sheet as claimed in claim 6 wherein said first layer has a grammage less than 50 g/m².

8. A multi-layer sheet as claimed in claim 6 which additionally includes a third layer, and wherein said third layer was formed by suspending glass fibers in a gaseous medium, and collecting the suspended glass fibers as said third layer on said first and second layers while they are supported on a foraminous material.

9. A VRLA battery comprising a case, having alternate negative and positive plates in said case, positive and negative terminals, suitable electrical connections among said plates and said terminals, and separator material between alternate ones of said positive and negative plates that is a multi-layer sheet as claimed in claim 6.

10. A VRLA battery comprising a case, having alternate negative and positive plates in said case, positive and negative terminals, suitable electrical connections among said plates and said terminals, and separator material between alternate ones of said positive and negative plates that is a multi-layer sheet as claimed in claim 6, and has a minimum nitrogen BET surface area of at least 1.1 m²/g.

11. A multi-layer sheet as claimed in claim 6 wherein said first layer has a minimum nitrogen BET surface area of at least 1.6 m²/g.

12. A multi-layer sheet as claimed in claim 6 wherein said second layer contains at least 50% of particulate silica powder, based upon the weight of fibers and silica powder in said second layer.

13. A multi-layer sheet as claimed in claim 6 wherein said second layer contains at least 70% of particulate silica powder, based upon the weight of fibers and silica powder in said second layer.

14. A glass fiber separator material comprising a mass of intermeshed glass fibers substantially all of which have a fiber diameter not creater than about 15 μm, and at least 5 percent w/w of which have a fiber diameter less than 1 μm, and, distributed through the glass fibers, from 0.2 percent w/w to 20 percent w/w of cellulose fibrils from a slurry having a Canadian freeness sufficiently low that a battery made with the separator has a service life, when cycled, at least 10 percent greater than an otherwise identical separator where glass fibers having an average diameter greater than 1 μm replace the cellulose fibrils, said separator having been produced by suspending glass fibers and from 0.2 percent w/w to 20 percent w/w of cellulose fibrils, based upon the weight of glass fibers and cellulose fibrils, in a gaseous medium, collecting the suspended glass fibers on a foraminous material, and removing the separator material from the foraminous material.

15. A sealed lead/sulfuric acid recombinant storage battery comprising a plurality of lead plates in a closed case, a fibrous sheet plate separator as claimed in claim 14 between adjacent ones of said plates, and a body of a sulfuric acid electrolyte absorbed by each of said separators and maintained in contact with each of the adjacent ones of said plates.

16. A glass fiber separator material which is a mass of intermeshed glass fibers produced by suspending first glass fibers having a given average fiber diameter in a gaseous medium, collecting the suspended first glass fibers on a foraminous material, suspending second glass fibers having an average fiber diameter different from the given average fiber diameter in a gaseous medium, collecting the suspended second glass fibers on the collected first glass fibers, and removing the separator material from the foraminous material, with the proviso that the mass of intermeshed glass fibers has a BET surface area of from 0.2 to 5 m² per gram.

17. A glass fiber separator material as claimed in claim 16 wherein the first glass fibers and the second glass fibers have substantially the same chemical composition.

18. In a storage battery comprising a plurality of lead plates in a closed case, a fibrous sheet plate separator between adjacent ones of said plates, and a body of a sulfuric acid electrolyte absorbed by each of said separators and maintained in contact with each of the adjacent ones of said plates, the improvement wherein said separator sheets consist essentially of intermeshed glass fibers produced by suspending glass fibers in a gaseous medium, collecting the suspended glass fibers on a foraminous material, and separating the collected fibers from the foraminous material, with the proviso that the mass of the fibers suspended and collected has a BET surface area of from 0.2 to 5 m² per gram, and with the further proviso that said separator consists of the glass fibers, as collected, without further processing.

* * * * *